United States Patent [19]

Clarke et al.

[11] 4,256,529
[45] Mar. 17, 1981

[54] ULTRASONIC APPARATUS FOR MANUFACTURING BRASSIERE TAPES

[75] Inventors: Robert A. Clarke, White Plains; Peter J. Kuhl, Jackson Heights; Richard H. Paschke, Medford, all of N.Y.

[73] Assignee: Cavitron Corporation, New York, N.Y.

[21] Appl. No.: 1,083

[22] Filed: Jan. 5, 1979

Related U.S. Application Data

[60] Division of Ser. No. 826,756, Aug. 18, 1977, Pat. No. 4,158,584, which is a continuation-in-part of Ser. No. 736,756, Oct. 29, 1976, Pat. No. 4,045,271.

[51] Int. Cl.$^3$ .................. B29C 27/08; B32B 31/18
[52] U.S. Cl. ................... 156/515; 156/537; 156/543; 156/580.1; 156/580.2
[58] Field of Search .............. 156/580.1, 580.2, 73.1, 156/73.3, 538, 543, 515; 228/1 R

[56] References Cited

U.S. PATENT DOCUMENTS

| | | | |
|---|---|---|---|
| 2,364,870 | 12/1944 | Otto | 156/222 |
| 2,440,664 | 4/1948 | Irons | 156/196 |
| 2,728,439 | 12/1955 | Murphy et al. | 156/88 |
| 2,861,276 | 11/1958 | Alfandre | 112/407 |
| 2,898,257 | 8/1959 | Carver | 156/289 |
| 3,272,682 | 9/1966 | Balamuth et al. | 156/580.2 |
| 3,439,392 | 4/1969 | McNab, Jr. | 156/580.1 X |
| 3,505,136 | 4/1970 | Attwood | 156/580.1 X |
| 3,530,813 | 9/1970 | Roseman et al. | 112/407 |
| 3,649,421 | 3/1972 | Berleyoung | 156/73.1 X |
| 3,654,041 | 4/1972 | Wysong | 156/73.1 X |
| 3,765,589 | 10/1973 | Walrauen et al. | 156/73.1 |
| 3,776,804 | 12/1973 | Monahan et al. | 156/515 |
| 3,817,802 | 6/1974 | Meyer | 156/73.1 |
| 3,859,150 | 1/1975 | Van Amburg | 156/66 |
| 3,874,975 | 4/1975 | Lagain | 156/515 |
| 4,025,374 | 5/1977 | Spindler et al. | 156/73.1 |
| 4,097,327 | 6/1978 | Calemard | 156/580.2 |

*Primary Examiner*—Michael G. Wityshyn
*Attorney, Agent, or Firm*—Robert M. Skolnik; William R. Evans

[57] ABSTRACT

Brassiere tapes having a body portion and a pair of overlapping tabs extending outwardly therefrom are manufactured by providing a continuous strip of material for the tapes having fastener elements spaced along the strip and layers in the body portion and in each of the tabs weldable with ultrasonic vibratory energy. The tabs are separated physically from each other such that the individual layers in the strip may be simultaneously severed and welded across the body portion and the tabs when interposed between ultrasonically vibrating horn and anvil devices, except that the tabs which are physically separated from each other are not welded to each other. Compliant means for mounting of the anvil is provided so that the cutting edge for severing the tapes from the strip which is associated with the anvil is not readily dulled by the repetitive contacting engagement of the horn and anvil surfaces in the operative position. Advancing the strip between the horn and the anvil is accomplished by means of the elements on the strip for continuously producing tapes having a desired number of elements thereon.

12 Claims, 16 Drawing Figures

ULTRASONIC APPARATUS FOR MANUFACTURING BRASSIERE TAPES

CROSS REFERENCE TO RELATED APPLICATION

This is a division of application Ser. No. 825,756, filed Aug. 18, 1977, now U.S. Pat. No. 4,158,584, which is a continuation-in-part of Ser. No. 736,756, filed Oct. 29, 1976, and now U.S. Pat. No. 4,045,271.

BACKGROUND OF THE INVENTION

1. Field of the Invention

The present invention relates generally to the manufacture of articles from an elongated continuous strip, and more particularly concerns an improved apparatus and method for producing tapes to be sewn to brassieres in the manufacture thereof.

In the manufacture of brassiere wearing apparel, or undergarment, one tape having hooks thereon and another tape having eyes theron are attached to opposite sides of the brassiere for adjustable coupling in a manner well known.

While the instant invention will be primarily described in conjunction with the manufacture of brassiere tapes, it will be apparent that the same principles disclosed herein may be applied to other articles formed from a continuous strip having overlapping layers of fabric, or material, with a pair of tabs or other protrusions extending therefrom for subsequently securing the article to a garment or other end product.

2. Description of the Known Art

In the known art, the useful life of an anvil or horn with ultrasonic energy utilized to simultaneously weld and sever a strip into the tapes on a sequentially repetitive basis is limited. To accomplish this simultaneous welding and cutting, either the anvil or horn is provided with a surface formed as a knife edge that extends transversely to the path of travel of the strip.

For example, the anvil may be provided with a cutting or knife edge and the horn with a mating surface. The vibratory mechanical motion hammering the cutting edge on the horn at the end of each welding and cutting cycle then tends to dull the cutting edge over a period of time.

The prior art, as for example illustrated in U.S. Pat. No. 4,025,374, issued May 24, 1977, shows that ultrasonic energy may be utilized for simultaneously wleding and cutting overlapping layers of weldable material. But it does not show how to prolong the usefulness of ultrasonic apparatus to reduce "down time" which is most expensive in production facilities.

SUMMARY OF THE INVENTION

An object of the present invention is therefore to provide an improved method and apparatus for continually forming brassiere tapes or the like.

The outstanding and unexpected results obtained by the practice of the method and apparatus of this invention are obtained by a series of features, steps and elements assembled and working together in interrelated combination.

A brassiere tape which comprises a body portion having various overlapping layers of material with a synthetic composition level sufficient to permit ultrasonic welding thereof will be used to illustrate the present invention. The body portion extends from a forward edge to a pair of tabs extending outwardly from the body portion and each terminating in a rear edge in substantially parallel spaced relationship to the forward edge. Spaced apart ends extend between the edges. At least one row of elements in the form of hooks or eyes is secured to the body portion along a line parallel to the ends, and the layers of material at each of the ends on the tape are welded to each other between the spaced apart edges, but the tabs are adapted to receive therebetween the portion of the brassiere to which they are to be secured. A plurality of longitudinally aligned but spaced apart spot welds is also provided on each body portion adjacent each of the ends.

The brassiere tapes are ultrasonically produced from an elongated continuous strip of material formed of flexible layers and having a plurality of spatially separated elements in the form of hooks or eyes. In view of the fact that each tape had to have an equal number of hooks or eyes contained thereon, and that the elements were not always equally spaced, the means for feeding of the strip on an intermittent basis to produce the individual tapes was also a problem that has been solved as hereinafter discussed.

Basically the apparatus comprises ultrasonic welding means having a horn terminating in a surface for engaging one side of the strip, and means for vibrating the horn at an ultrsonic rate. An anvil having a surface for opposing and cooperating with the horn surface engages the opposite side of the strip. The horn and the anvil are adapted to simultaneously sever and weld the strip transversely between the edges when brought into operative relationship with each other.

To provide the simultaneous cutting and welding operation, the anvil surface may comprise a knife edge extending transversely to the path of travel of the strip for compressing and welding the material interposed between the anvil and the horn surfaces along a comparatively narrow path in response to the ultrasonic energy applied to the horn, the knife edge cutting through the strip, including the tabs and an insulation element extending therebetween. Second surface features are formed adjacent each side of the knife edge for simultaneously forming a plurality of embossed welds between the layers of material of the strip on the trailing end of one tape cut from the strip and the leading end of the next tape.

This invention provides a compliant mounting for the anvil which has the property of deforming when subjected to a predetermined pressure when the surfaces of the horn and the anvil are brought into operative position to each other. In this way, the cutting edge associated with the anvil is not readily dulled by the repetitive contacting engagement of the surfaces in the operative position.

A clamp is also provided for releasably retaining the anvil in abutting engagement with a compliant element forming the compliant mounting. In this manner the anvil means is free to move in conjunction with any deflection caused by the surfaces engaging each other. It has been found that this type of mounting arrangement will permit the anvil means to even resonate at its own frequency of vibration since it is not rigidly coupled to any mounting structure. This arrangement keeps the cutting edge from dulling by the hammering contact with the surface of the horn as the layers of material are severed and the cutting edge bottoms against the horn surface.

Still further, a way for laterally adjusting the anvil surface is also provided so as to properly position the welds across the strip. In this manner adjustment may be accomplished with a minimum of effort and a minimum of "down time".

Interposing means is provied for positioning between the tabs which, in one embodiment, is an insulator element capable of transmitting therethrough ultrasonic vibratory energy when the anvil means and the horn are brought into operative relationship with each other or, in another embodiment, an anvil portion cooperative with a horn portion to weld together only the individual layers of material in each of the tabs.

Also, because the spacing between the elements along the strip is not equidistant, indexing or feeding means is provided for advancing the strip to the working station consisting of the horn and anvil means which, to avoid the tolerance buildup between the elements which could result in the horn and anvil means engaging an element rather than the space therebetween, advance the leading end of the strip a distance predetermined by means of the elements. For this, the feeding means is movable from a retracted position to an extended position in timed relationship to the reciprocating means, and damping means damp the movement of the feeding means at the extended position and the retracted position.

BRIEF DESCRIPTION OF THE DRAWINGS

Although the characteristic features of this invention will be particularly pointed out in the claims, the invention itself, and the manner in which it may be made and used, will be better understood by referring to the following description of the preferred embodiments taken in connection with the accompanying drawings in which:

DETAILED DESCRIPTION OF THE DRAWINGS

Figure 1:
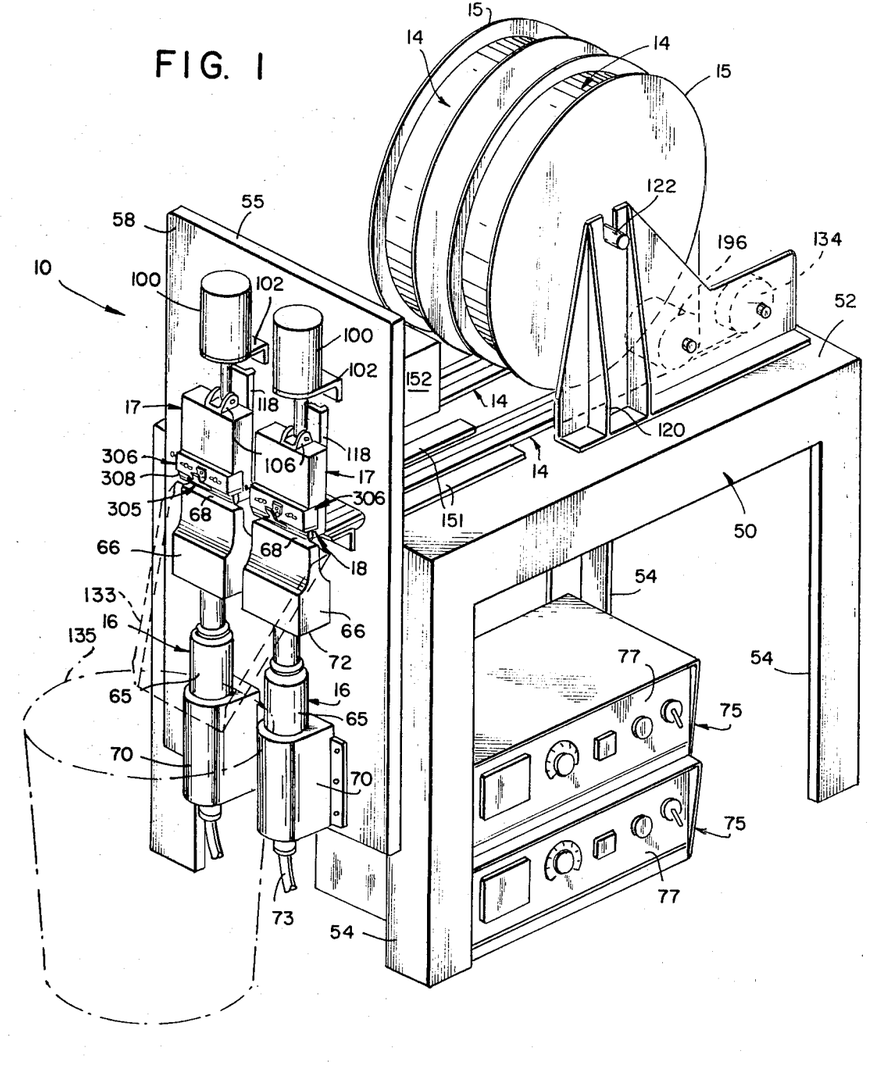
FIG. 1 s a front perspective view of the preferred embodiment of the present invention.
Figure 2:
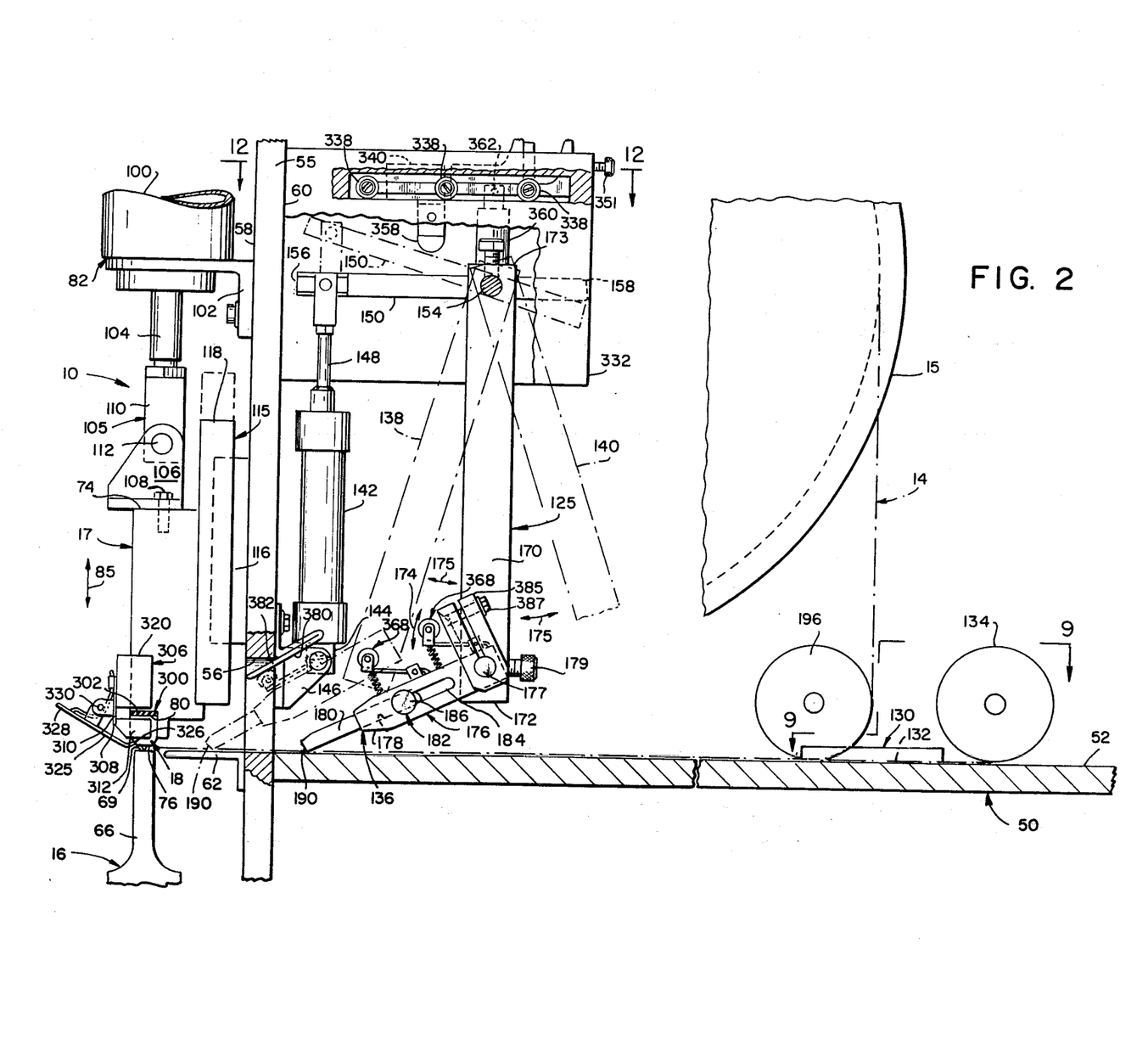
FIG. 2 is a partial side view illustrating the equipment of FIG. 1.

Referring to the drawings, and initially to FIGS. 1 and 2 thereof, there is illustrated a preferred embodiment of apparatus 10 for manufacturing individual articles or tapes 12 (FIG. 5) from a continuous elongated strip 14 provided on a roll 15. To produce the individual tapes 12 from the strip 14, the apparatus includes interrelated ultrasonic welding means 16 and cooperating anvil support 17 with removable anvil means 18.

To more fully appreciate the present invention, an initial discussion of the continusous strip 14 and the configuration of the tape 12 for a brassiere is helpful. The strip 14, when formed into tape 12 as illustrated with respect to FIGS. 3 through 6, includes a body portion 20 and a pair of tabs or flaps 22 extending outwardly from the body portion 20 to define one end or forward edge 24 on the body portion and an opposite end or rear edge 25 on each of the respective tabs 22. The front edge 24 and rear edges 25 extend in substantially parallel spaced relationship to each other. Forming the tape 12 also defines a pair of spaced apart side edges or ends 26 and 27. The end 26 is sometimes referred to as the forward or leading end of the strip 14, and the end 27 is sometimes referred to as the trailing or rear end of the tape. Mounted on the upper surface 28 of the strip 14 are a plurality of spaced apart rows of fastening elements 30.

Figures 3, 4, 6:
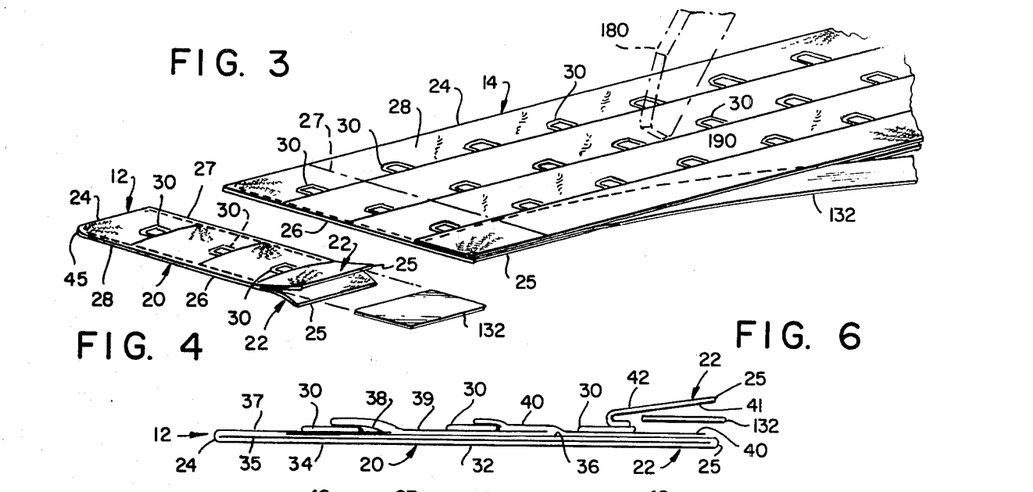
FIG. 3 is a perspective diagrammatic view of the elongated tape and the insulator element positioned relative to the tabs.
FIG. 4 is a perspective view of a brassiere tape formed from the elongated strip.
FIG. 6 is a side view illustrating the respective layers of material forming the strip.
Figure 5:
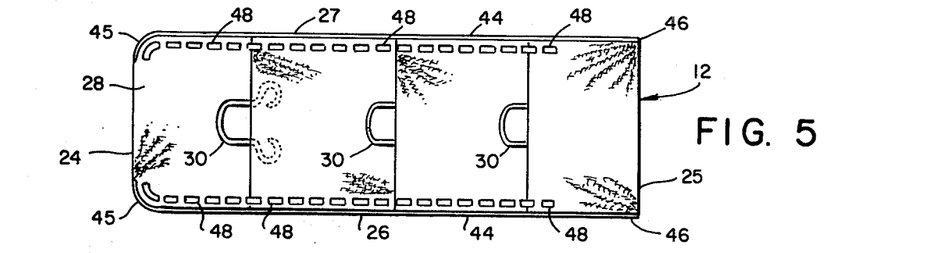
FIG. 5 is a top plan view of an article manufactured by the equipment illustrated in FIG. 1 in the form of a brassiere tape.

These rows of elements extend parallel to the ends 26 and 27. The elements 30 may take various forms and shapes and generally include an eye, as illustrated in FIGS. 4 and 5, or a hook. As particularly illustrated in FIG. 6, the individual tape 12 is comprised of flexible layers of material which may be woven as a fabric or of synthetic sheet material. If the individual layers of material are woven, they have a sufficient synthetic content, generally at least thirty percent, in order to be ultrasonically weldable. The spatially separated elements 30 extend above the upper surface 28 such that the strip 14 may be advanced on the lower surface 32 thereof.

To form the layered tape, the strip 14 has overlapping sheets 34, 35, 36, 37, 38, 39, 40, 41 and 42. In certain areas of the strip 14 between the strip edges 24 and 25, there may be two individual layers of fabric in overlapping relationship to each other or there may be more. Various ones of layers 34 through 42, inclusive, are obtained by folds. When the strip 14 is processed between the ultrasonic welding means 16 and anvil means 18, a particular width is severed, and simultaneously there is formed a welded or bonded seam 44 adjacent each end 26 and 27 of the next and severed individual tapes, respectively. The seam or weld 44 has a forward end 45 that may be contoured and extend adjacent the forward edge 24 but terminates at a terminal end 46 at the other, rear edge 25 of the tape.

Accordingly, the weld extends across each of the tabs 22 such that the overlapping layers of material are welded all along each end 26 and 27 of the tape 12. For both strength and aesthetic reasons, a plurality of longitudinally aligned spaced apart spot welds are provided adjacent each seam 44. Having produced a tape 12 with these characteristics, the tape 12 may thereafter be utilized by securing the respective tabs 22 which have not been welded together in a manner hereinafter described in greater detail onto the brassiere.

Returning to FIGS. 1 and 2, a frame 50 has a supporting surface 52 on which the strip 14 will be intermittently advanced. The frame 50 may include a plurality of vertically extending legs 54 for supporting the surface 52. A support or mounting plate 55 extends vertically from one end of the frame 50 with an opening 56 extending therethrough to permit the passage of the continuous strip 14. The mounting plate 55 has a front surface 58 and a rear surface 60.

A bracket 70 mounts the ultrasonic welding means 16 vertically on the mounting plate 55. The apparatus 10 is capable of producing the tapes 12 from either a single roll 15, dual rolls mounted side-by-side with each other as illustrated in FIG. 1, or several rolls.

The ultrasonic welding means 16 is comprised of an ultrasonic motor or transducer 65, well known in the art, that has coupled thereto an ultrasonic horn or tool 66 having a forward end 68 terminating or formed in a surface 69 that extends in a plane substantially parallel with the supporting surface 52 and a support extension 62 on the other side of the mounting plate 55. The horn 66 has its output end 68 in position to engage the lower surface 32 of the strip 14 when it is advanced intermittently with respect thereto. The horn 66 may be in the form of an acoustical impedance transformer designed to increase the amplitude of vibration between its rear end 72 and the forward end 68. A cable 73 connects each motor 65 to a converter or generator unit 75 which has associated therewith various controls on the front panel 77.

The operating frequency of the motor 65 is determined by the relationship with the generator unit 75 which receives 60 Hz line voltage and delivers high frequency power, typically in the range of 20 kHz to 40 kHz. The term "ultrasonic" as herein used is to cover the frequency range of 5 kHz to 1,000 kHz. As is well known, the motor 65 converts the electrical energy applied thereto to mechanical vibrations by use of piezoelectric or magnetostrictive elements.

Figure 7:
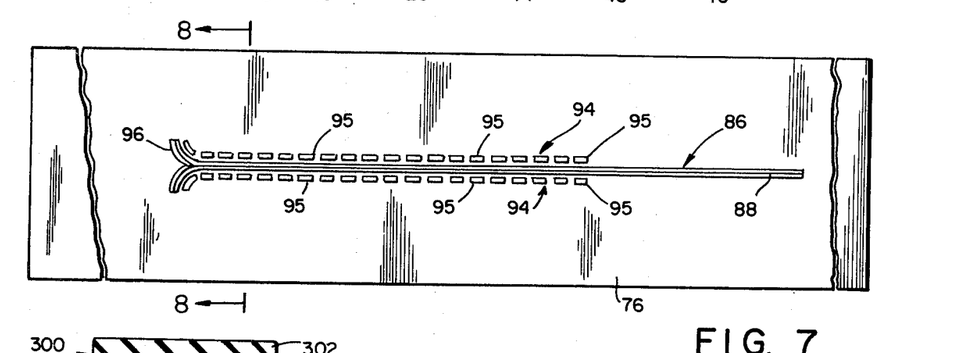
FIG. 7 is a bottom plan view of the anvil having thereon the knife edge and elements for forming the embossed welds.
Figure 8:
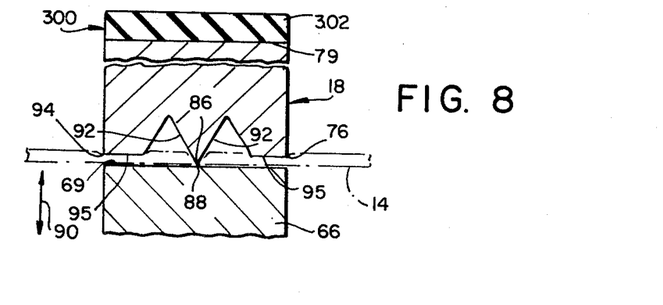
FIG. 8 is a sectional view taken along lines 8—8 of FIG. 7.

The anvil means 18 is mounted in cooperating relationship with the ultrasonic welding means 16 for engaging the opposite or upper side 28 of the strip 14. The anvil 18 and horn 66 are preferably adapted to simultaneously sever the strip 14 transversely between the edges 24 and 25 and form the welds 44 adjacent each of the ends 26 and 27. The anvil support 17 has a top end 74 and bottom end 80. The anvil 18 has a bottom end surface 76 and a top end 79, the bottom end surface 76 forming part of the working surface, as illustrated in FIGS. 7 and 8 and hereinafter discussed.

The anvil means 18 may extend transversely across the width of one or two horns 66 and is at least partly removable. In this way the anvil means 18 may be replaced from time to time if the configuration of the welds 48 is to be modified, or if the knife edge associated with the anvil means 18 dulls.

Reciprocating means 82 moves anvil 18 between an open position, in which the anvil means 18 and horn 66 are vertically spaced apart for receiving the strip 14 therebetween, to an operative or closed position, as illustrated in FIGS. 1 and 2, in which the bottom end surface 76 of the anvil means 18 and the surface 69 of the horn 66 are moved together for engaging the strip 14 on opposite sides thereof. The reciprocating means is cycled to maintain the operative position for a selected period of time in order to perform the necessary cutting and welding operations.

It is fully appreciated that although in the preferred embodiment the anvil 18 is mounted for reciprocal motion, as illustrated by double headed arrow 85, it is also possible to reciprocate the ultrasonic motors 65. Furthermore, the surface 69 of the horn 66 may have the raised portions thereon as well as a cutting edge, as illustrated in FIGS. 7 and 8. The horn 66 is longitudinally vibrated to apply the vibratory forces in a plane and substantilly perpendicular to the bottom end 76 of the anvil means 18. Other means of providing this vibratory motion are within the scope of the present invention.

The individual removable anvils 18 are illustrated in FIGS. 7 and 8 and are designed to simultaneously sever and weld the strip 14 transversely across its width between the spaced apart edges 24 and 25. For this, the anvil surface 76 has first surface means 86 for engaging the material to be welded and severed between the edges 24 and 25. The first surface means 86 is formed with a knife edge 88 extending transversely to the path of travel of the strip 14 for severing the material interposed between the first surface means 86 and the forward end 68 of the horn 66 which is longitudinally vibrating at an ultrasonic rate, as illustrated by double headed arrow 90.

The knife edge 88 is inclined outwardly into bevelled surfaces 92 that are designed to simultaneously weld or fuse the overlapping layers of meterial 34 through 42, inclusive, that are engaged. Accordingly, the knife edge 88 and bevelled sections 92 provide a comparatively narrow path responsive to the ultrasonic energy applied to the horn 66.

For aesthetic purposes, as well as for strength, the individual spot welds 48 are formed by providing second surface means 94 adjacent each side of the first surface means 86. The second surface means 94 include a longitudinal row of bosses 95. The bosses 95 act in conjunction with the knife edge 88 which, however, extends farther than the bosses 95 for the cutting operation. In this manner the trailing end 27 of one article and the leading end 26 of the next article are formed with each reciprocation of the equipment.

It is to be appreciated that the shape, size and contour of the first surface means 86 and second surface means 94 may be varied to obtain the desired end result. In FIG. 7 the forward end 96 of the cutting edge 88 is contoured to obtain a rounded forward end 45 on the individual tape 12. In addition, the cutting edge 88 extends beyond the last boss 95 so as not to produce the individual spot welds 48 across the entire width of the individual tabs 22, as illustrated in FIG. 5.

Returning to FIGS. 1 and 2, the reciprocating means 82 comprises a pair of double acting cylinders 100 vertically mounted as by brackets 102 to the front surface 58 of mounting plate 55 and a longitudinally extending shaft 104. The shaft is connected by linkage means 105 to the upper end 74 of each anvil support 17. The linkage means 105 includes a bracket 106 secured to the anvil top end 74 as by fasteners 108 and a shaft extension member 100 connected by a transversely extending pin 112 to the bracket 106. This permits a certain degree of freedom of motion during the reciprocation of the anvil support 17 in the direction transverse of double headed arrow 85.

The reciprocating means 82 also comprises guide means 115 that include a guide plate 116 secured to the mounting plate 55 on the front surface 58. In operative relationship to the guide plate 116 is a guide member 118 which may have a complementary interlocking arrangement with the guide plate 116. The guide member 118 is coupled to the anvil support 17 for reciprocation therewith between the operative position and open position of the tool 16 and anvil means 18.

In accordance with the above described apparatus 10, each time the anvil means 18 and horn 66 are brought into operative position with respect to each other, as illustrated in FIG. 8, there is intimate contact between the knife edge 88, and the surface 69 of the horn 66. This contact has been found to dull the cutting edge 88 faster than the dulling normally associated with a cutting edge that is repetitively reciprocated against an opposing surface.

This is attributed to the intimate contact of the cutting edge 88 with the ultrasonically vibrating surface 69 of the horn 66 upon each cutting and welding cycle and the resultant hammering of the knife edge 88. This hammering for a time period of only a few seconds or less, on each repetitive welding and cutting cycle, resulted in premature dulling of the knife edge 88. This required replacement of the anvil means 18 at a rate which resulted in excessive "down time", and further detracted from the consistent quality of the desired clean edges or ends 26 and 27 of each tape 12.

To overcome this problem, applicants have discovered compliant means 300 (FIG. 2). The compliant means 300 includes a compliant element 302 illustrated in FIGS. 2 and 8 and having the property of deforming when subjected to a predetermined pressure from bringing the surfaces 88 and 60 into their operative position.

Accordingly, the compliant or deformable element or medium 302 is interposed between the top end 79 of the anvil means 18 and the bottom end 80 of the anvil support 17. The thickness of the compliant element 302 may vary, as well as the material it is selected from. Rubber has been found to be a satisfactory material from which the compliant element 302 may be fabricated.

In effect, the compliant element 302 isolates the anvil means 18 from the anvil support 17, such that vibratory mechanical motion transmitted by the horn 66 is substantially confined to the anvil means 18. This isolation by the acoustical mounting of the compliant element 302 permits the anvil means 18 to resonate at a frequency independently of the horn 16 when the surfaces 69 and 86 are brought into their operative position. By permitting the anvil means 18 to resonate at its own frequency, it has been discovered that the life of the cutting edge surface 88 is prolonged.

Figure 11:
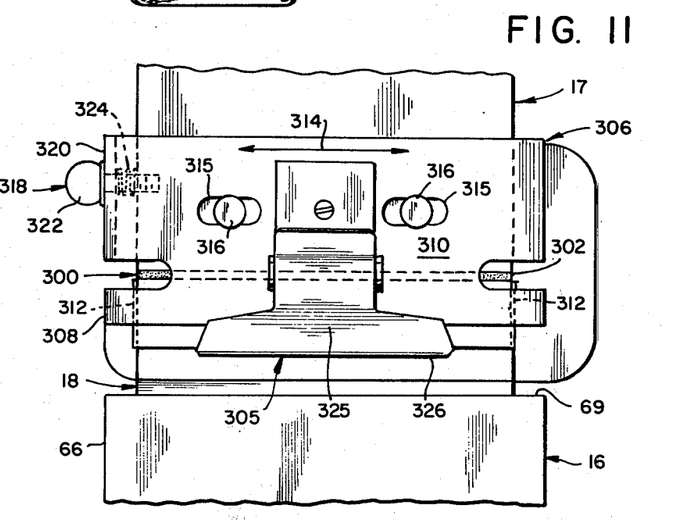
FIG. 11 is a fragmentary front plan view illustrating the manner in which the compliant mounting of the anvil means is obtained.

Clamping means 305 (FIGS. 1, 2, and especially 11) mounts the anvil means 18 in conjunction with the compliant means 300 for releasably maintaining the anvil means 18 in abutting engagement with the compliant means 300. In this manner the anvil means 18 is free to move in conjunction with any deflection or deforming of the compliant means 300. The compliant element 302 may remain loose in position with sufficient holding force applied by the clamping means 305.

The clamping means 305 also includes adjusting means 306 for incrementally adjusting the lateral position of the anvil means 18 for controlling the location of the welds 48 across the strip 14. This accommodates different strip widths (dimensional spacing between the forward edge 24 and rear edge 25) which may vary from one strip 14 utilized in production to another with a minimum of effort and "down time".

The adjusting means 306 includes a holder 308 having a front wall 310 and a pair of oppositely and inwardly disposed lips 312 that extend on opposite sides of the anvil means 18 to straddle the same snugly such that any lateral adjustment of the holder 308 in the direction of double headed arrow 314, in FIG. 11, will laterally move the anvil means 18.

In order to provide for this lateral adjustment, the front wall 310 has a pair of elongated apertures 315 through which a pair of supports or protrusions 316 extend. Each support 316 is fixedly secured to the anvil support 17 such that the elongated apertures 315 provide a track along which the holder 308 slides on the supports 316 for lateral adjustment of the anvil means.

Coupling means 318 laterally adjusts the holder 308. The coupling means includes a paid of ribs 320 that extend inwardly from the front wall 310 of holder 308 on at least one side of the anvil support 17, a fastener 322 that is threadably engaged into anvil support 17, and a spring 324 in telescopic relationship to the fastener 322 and extending from the rib 320 to the anvil support 17.

Spring 324 acts to keep the rib 320 laterally spaced from the anvil support 17. The fastener 322 then can be rotated to laterally adjust the anvil means 18 in either direction of double headed arrow 314. This task is accomplished without the need to disassemble the production equipment.

The clamping means 305 also includes a lever 325 pivotally mounted to the holder 308 for yieldably urging the anvil means 18 into contacting engagement with the compliant element 302. The lever 325 has a forward end 326 for engaging the anvil means 18 along one edge which may be inclined at an appropriate angle such that the anvil means 18 is nested between the lips 312 and one end of the anvil support 17, as illustrated in FIG. 2. The other, free end 328 of lever 324 can be moved inwardly about pivot pin 330 such that the forward end is retracted, thereby permitting the anvil means 18 to be readily removed from its position but biased in a conventional manner on wall 310.

Returning to FIGS. 1 and 2, the double acting cylinder 100, a fluid activated piston well known in the art, moves the anvil means 18 in timed relationship to the movement of the strip 14 on an intermittent basis. The continuous strip 14 is provided on a roll 15 mounted rearwardly of the reciprocating means 82 on a support unit 120 that extends from the surface 52 of the frame 50 and a transversely extending support shaft 122 to the support unit 120 to permit freedom of rotation of one or two rolls 15.

To intermittently advance the strip 14 from roll 15, feeding means 125 is provided. The feeding means 125 intermittently advances the leading end of the strip 14 a predetermined distance by means of the elements 30 contained thereon, as illustrated in FIG. 3. The feeding means 125 is movable from a retracted position to an extended position in timed relationship to the reciprocating means 82.

Simultaneously with the operation of the feeding means 125, interposing means 130 progressively interposes a continuous strip of insulation element 132 from a roll 134 between the tabs 22 as the strip 14 is advanced. The insulation element 132 is characterized in that while separating the tabs 22 physically from each other, it simultaneously is capable of maintaining the tabs 22 in acoustical energy coupling relationship to each other in the operative position of the reciprocating means 82.

This permits the individual layers of material in each of the respective tabs 22 to be welded to each other. Specifically, the layers of material 41 and 42 are welded to each other in one tab and layers 32, 35, 36, and 40 are welded to each other in the other tab 22. At the same time the insulation element 132 prevents the adjacent overlapping layers 40 and 41 of different tabs 22 from welding to each other. For this, the insulation element 132 may be of a paper or plastic material also characterized in that it does not bond to the layers of material from which the tabs 22 are produced. A suitable plastic material has been found to be Teflon and, paper, one that is waxed, or otherwise coated to avoid bonding to the material.

The thickness of the insulation element 132 is selected to be easily severed. As illustrated in FIG. 4, the severed insulation element 132 is thereafter readily removable from between the tabs 22. In operation the severed individual tapes 12 fall down a chute 133 provided beneath the horns 66 and into a bin 135 in which they are accumulated.

In view of the fact that the elements 30 vary as to their longitudinal spacing, the feeding means 125 has been designed to advance the strip each time based upon a particular number of elements 30. This is accomplished when the horn 66 is ultrasonically vibrating and the work station comprised of the anvil means 18 and horn 66 are in their open position to permit feeding the strip a discrete amount therebetween.

The feeding means 125 is shown in FIGS. 2, 12, 13, and 14 and comprised of engaging means 136 pivotably movable into contact with one of the elements 30 (FIG. 3) on the strip 14 when advancing same and over the elements 30 when moved from the extended position designated for convenience by numeral 138 to a retracted position identified by numeral 140. The feeding means 125 includes a double-acting air or hydraulic activating unit 142 that is pivotally secured at one end 144 to a clip 146 mounted on the back end 60 of mounting plate 55. The opposite end of the activating unit 142 has a piston rod 148 extending outwardly therefrom and coupled to a pivot arm or member 150. The pivot arm 150 may be partially within a housing 152 that is also mounted on the rear surface 60 of the mounting plate 55. To permit the angular pivotal movement of the arm 150 between the respective positions illustrated, a transversely extending shaft 154 is provided between the respective ends 156 and 158 of the arm 150. The shaft 154 permits the arm 150 to move with the movement of the rod 148 of the activating unit 142.

Figure 12:
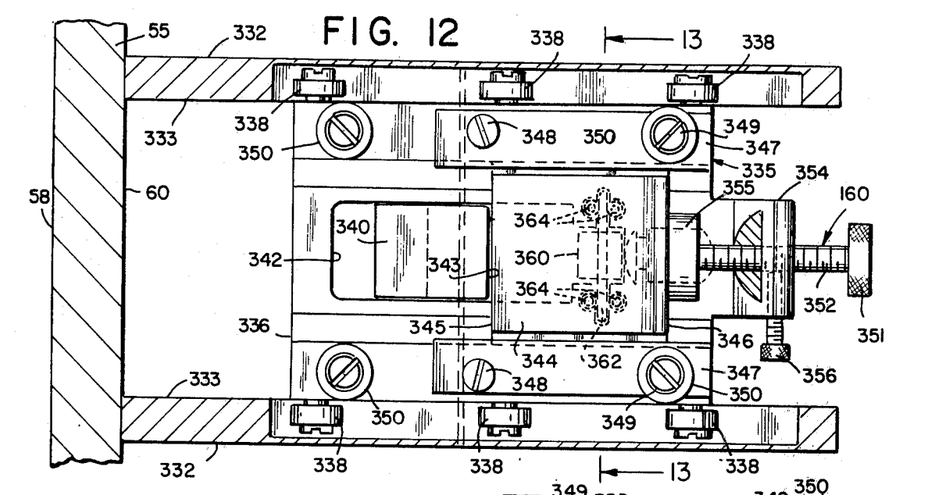
FIG. 12 is a fragmentary enlarged top plan view, partially in section, taken along lines 12—12 of FIG. 2.
Figures 13, 14:
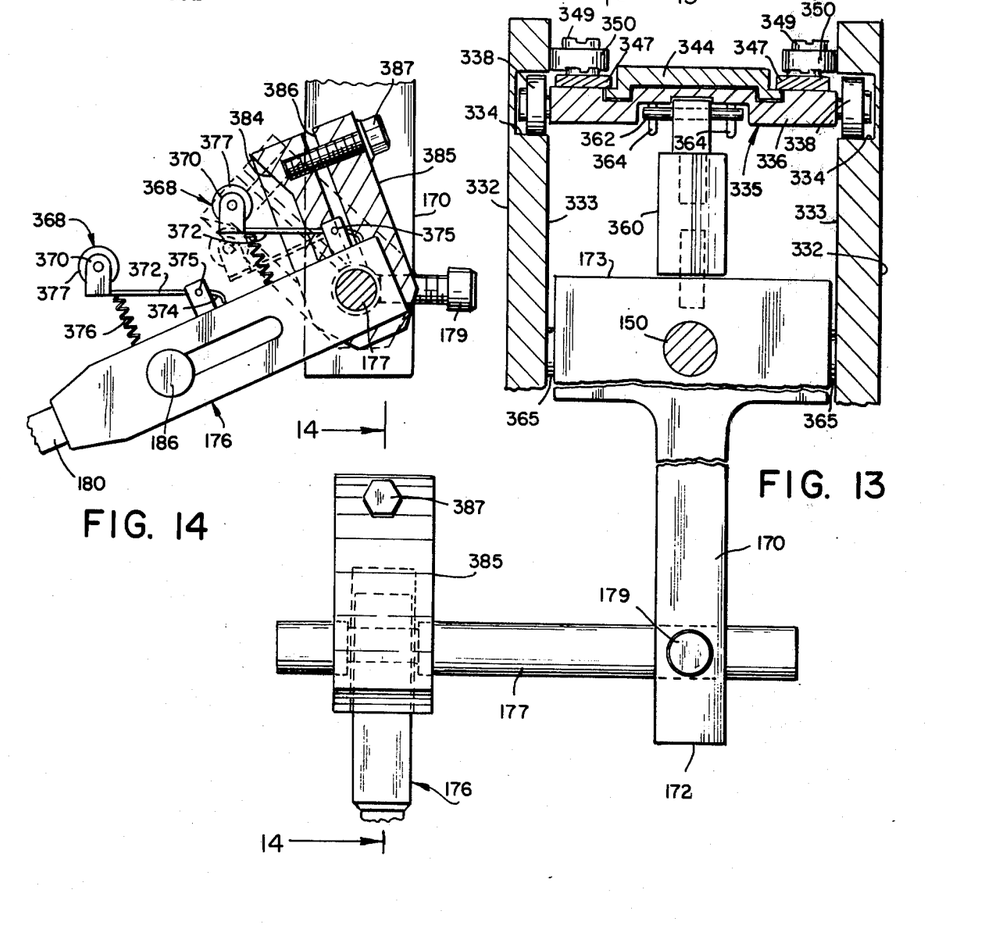
FIG. 13 is a sectional view taken along lines 13—13 of FIG. 12.
FIG. 14 is a sectional view taken along lines 14—14 of FIG. 13.

The linear travel of the engaging means 136 is related to the angular movement of the arm 150. To regulate the linear travel of the engaging means 136, limit means 160 is provided, as illustrated in FIGS. 12 and 13. To maintain high efficiency in production, i.e. a minimum of "down time", limit means 160 in the preferred embodiment of the present invention is designed to be linearly adjusted by merely adjusting a single element. In this manner the operator of the apparatus 10 may readily change the width of the tapes 12 being fabricated by the apparatus 10.

Limit means 160 is designed such that in the extended position 138 the distal end 190 of the finger element 180 is in the position illustrated in FIG. 2 at the anvil means 18 and ultrasonic welding means 16 which are then spaced apart. If the width of the tapes is to be altered, then the feeding member must be adjusted to vary its retracted position 140, one of which is illustrated in FIG. 2. To accomplish this adjustment, the limit means is provided.

The limit means include a pair of side plates 332 extending from the mounting plate 55 and each having an inner surface 333 with a horizontally extending channel or groove 334 for receiving a carriage assembly 335 for movement relative thereto. The carriage assembly has a carriage plate 336 horizontally mounted with vertical rollers 338 from each side thereof into the channels 334. In this manner the carriage assembly 335 is free to move horizontally relative to the side plates 332.

A mounting block 340 is fixedly mounted in the apparatus to extend upwardly through an aperture 342 in the carriage plate 336. The block 340 includes a front surface 343 for limiting the travel of the assembly 335 with a limit block 344 that overlies a portion of the carriage plate 336. The limit block 344 is free to move relative to the carriage plate 336 to control the linear travel of the carriage assembly 335 relative to the fixed mounting block 340.

The limit block 344 has a front end 345 and a rear end 346 spaced from each other and is secured to the carriage plate 336 by a pair of spaced apart plates 347. The plates 347 are secured to the carriage plate 336 by fasteners 348 and fasteners 349 that have rollers 350 associated therewith. The rollers 350 engage the inner surface 33 of each of the side plates 332. In this manner rolling engagement is maintained in both vertical and horizontal planes with the side plates 332.

Adjustment of the limit block 344 is provided by adjustment screw 351 which has a threaded shaft 352 extending through a support element 354. A swivel shoe 335 on one end of shaft 352 abuts the rear end 346 of the limit block 344. Adjustment of the screw 351 then will alter the linear distance that the carriage assembly 335 may reciprocate in order to alter the arc, as indicated by double headed arrow 175, that the feeding member 170 will be free to rotate.

Once the adjustment has been made, a set screw 356 locks in place the adjustment screw 351. The fixed block 340, as illustrated in FIG. 2, may further include a secondary travel-limiting element 358 extending in operative relationship to the pivot arm 150. Accordingly, the limit means 160, as described above, can be utilized to adjust the movement of the feeding member 170.

The feeding member 170 includes an extension element 360 having a transversely extending pin 362 which is received between oppositely disposed pairs of guide pins 364. The guide pins 364 extend downwardly from the carriage plate 336. The feeding member 170 is pivotally mounted between the side plates 332 by a mounting shaft 365. In this way pivotal movement of pivot arm 150 and feeding member 170 effectuates displacement through a selected linear distance of the carriage assembly 335 relative to the side plates 332, the screw 351 selecting the linear distance with the limit block 344.

It thus is possible with a minimum of effort and "down time" to change production runs to tapes of differing widths as required in production. The linear adjustment may permit variations over a range of a few inches such that the width of the resultant tapes may be adjusted to include one or more rows of hooks or eyes thereon.

The arm 150 is rigidly coupled to a feeding member 170 which extends downwardly therefrom. Two engaging means 136 are utilized for a dual production line, as illustrated in FIG. 1. Each of the engaging means 136 is mounted for pivotal movement at the lower end 172 of the feeding member 170 for movement in an arcuate path, as illustrated by arrow 174. The engaging means 136 is free to move in this arcuate path as the arm 170 moves in the path indicated by double headed arrows 175.

The engaging means 136 include housing means 176 which is pivotally mounted at one end on a transverse shaft 177 which extends through the feeding member 170 and is fixedly secured thereto by locking screw 179. The housing means 176 has an axially extending opening or groove 178 in which a finger element 180 is mounted in telescopic relationship for longitudinal adjustment relative thereto. Securing means 182 is provided in operative relationship with the housing means 176 and finger element 180 for locking them in a releasably fixed position relative to each other. The securing means is a fastener having a threaded portion that mates with a complementary threaded portion in the finger element 180 and projects through a channel 184 in the housing means 176 to a fastener head 186 for releasably locking the finger element 180 to the housing means 176. In this manner when the machine is initially calibrated, the exact position of the finger element 180 may be selected.

When the feeding member 170 is operated, it moves forward from the retracted position 140 to the extended position 138. This movement occurs in timed relationship to the anvil reciprocating means 82. To maintain the front or distal end 190 of the finger element 180 on the feeding member in contacting relationship with an element 30, the weight of the housing means 176 may be relied upon to provide a downwardly extending force in the direction of single headed arrow 174 as the finger element 180 pushes the strip 14 along the support surface 52 which also unwinds it from roll 15 via guide roll 196. This also unwinds the insulation element 132 from roll 134 for interposing between the tabs 22.

When the engaging means 136 has obtained the position illustrated at 138 with the distal end 190 adjacent the work station, its forward movement is stopped by the limit means 160. Reversing the movement of piston 148 then applies the necessary downward force on arm 150 to swing the feeding member 170 to the retracted position 140. During this movement the engaging means 136 is free to move over the elements 130. When the engaging means reaches the retracted position 140, as illustrated in FIG. 3, its end 190 is between two adjacent elements 30.

When the feeding member 170 moves to advance the housing means 176 and thus the strip 14 and thereafter returns to its retracted position, it has been determined that it is most important to avoid secondary motions of the housing means 176 immediately prior to reaching the fully forward or retracted positions 138, 140. Failure to do so has been found to cause secondary advancement of the strip 14, such that registration of the strip 14 relative to the horn 66 and anvil means 18 is not maintained.

To avoid this secondary advancement, damping means 368 is utilized in conjunction with the housing means 176. The damping means 368 inhibits movement of the engaging means 136 as it reaches the fully extended and retracted positions with, as illustrated in FIGS. 2 and 14, a pair of spring biased elements 370 aligned with each other on the housing means 176. Each of the spring biased elements 370 includes an arm 372 pivoted at one end 374 to the housing means 176 by shaft 375 and biased away from the housing means 176 by a spring 376.

To cushion engagement of the damping means 368, a roller 377 is mounted at the other end of the spring biased arms 372. In operative relationship to the forward position 138, there is a first contacting surface 380 in the form of an angularly disposed plate connected to the mounting plate 55 and partially extending through the opening 56.

In this manner the first contacting surface 380 is adapted to receive in contacting engagement the roller 377 of the forwardly mounted damping arm 372, such that the arm 372 is depressed to damp secondary position changes of the housing means 176 as it reaches the operative position of the anvil means 18 and horn 66 and is retracted therefrom.

In a similar manner the rearwardly mounted damping arm 372 is adapted to engage a second contacting surface 384 which similarly is adapted to damp movement of the retracted housing means 176. The second contacting surface is the forward edge of a contact assembly 385 that is fixedly secured to the shaft 177 by a slit 386 in the block or contact assembly 385 and an associated locking screw 387. In this manner the angle of disposition of the contact assembly 385 may be adjusted relative to the shaft 177. In contrast, the housing means 176 is pivotally mounted about shaft 177 and thus is free to be angularly pivoted with respect thereto.

In this manner the travel of the housing means 176 in conjunction with the feeding member 170 may be properly regulated such that the damping means 368 engages the first contacting surface 380 at the extended position 138 and the second contacting surface 384 at the retracted position 140. The damping means 368 thus acts to prevent secondary movement of the distal end 190 relative to the strip 14, but the rearwardly mounted damping arm 372 also may be adjusted such that minimal engagement with the second contacting surface 384 is maintained at all times.

Figure 9:
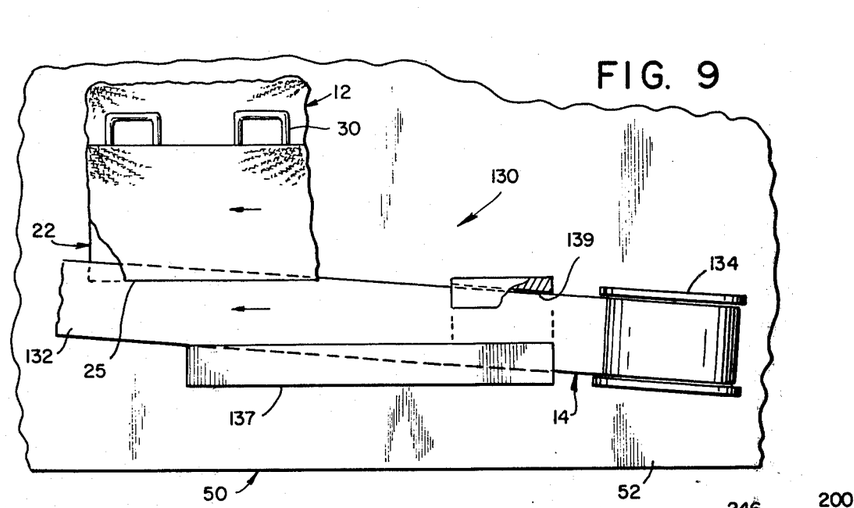
FIG. 9 is an enlarged fragmentary view, partly in section, taken along lines 9—9 of FIG. 2.

The interposing means 130, as illustrated in FIG. 9, is positioned between the insulation element roll 134 and the strip guide roll 196 (FIG. 2) to properly insert the insulation element 132 on a continuous basis as the strip 14 is advanced. The interposing means 130 includes an interposing plate 137 mounted on the supporting surface 52 and having a horizontally extending channel or groove 139 for receiving the insulation element 132. The channel 139 and the roll 134 are angularly disposed to initially insert the insulation element 132 between the tabs 22. A pair of guide rails 151, illustrated in FIG. 1, are provided in spaced relationship to each other on the supporting surface 52 adjacent the mounting plate 55. The guide rails 151 are in alignment with the horn 66 and provide the final positionment of the insulation element 132 between the tabs 22.

It is appreciated that the interposing means 130 may include a positive drive to advance the insulation element 132 if same is found necessary or desired. The need for a potitive drive will in part depend upon the characteristics of the insulation element 132 selected.

The movement of the feeding means 136 from its extended to retracted position takes place when the reciprocating means 82 is in its operative position. This interrelated movement and sequencing is accomplished by an automatic electrical control system that may be contained within the generator unit 75. The electrical control system provides the signal necessary for activating the reciprocating means 82 and maintaining the anvil means 18 and the horn 66 in operative relationship with each other for a specific period of time.

During this period the welding and cutting of the tape 14 takes place. Also during this period the activating unit 142 is energized such that the piston 148 moves downwardly to return the feeding means 136 to its retracted position 140, the anvil means 18 and the horn 66 then being in their operative position so as not to pull the strip 14 rearwardly with the retracting motion of the feeding means. This cycling of the apparatus 10 can occur in a predetermined time interval adjusted for the width of the tapes to be produced.

After a welding and cutting cycle has been completed, and the feeding means 136 returned to its retracted position 140, the reciprocating means 82 is activated for returning the horn 66 and anvil means 18 to their open position to permit the advancing of the next portion of the strip 14 by the feeding means 136.

Upon this activation of the reciprocating means 136, the forward end 190 of the finger element 180 engages the element 30, which may be in the form of a hook or an eye, and moves the strip 14 along the support surface 42 for the necessary distance.

Figure 10:
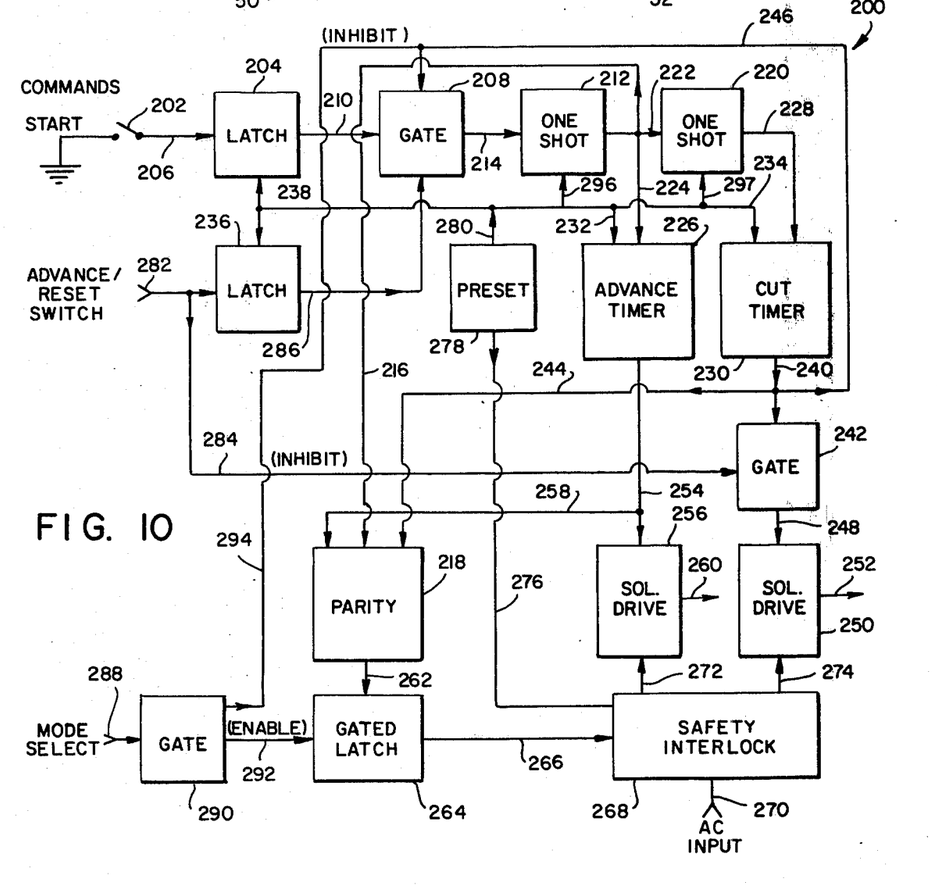
FIG. 10 is a functional block diagram of an automatic electrical control system for operating the apparatus.

Referring now to FIG. 10, there is shown a functional block diagram of a preferred embodiment of an automatic electrical control system 200 which is used to control the operation of the horn 16, the double acting cylinder 100 and the piston unit 142. The control system 200 is powered from a conventional source of 110 volts AC, not shown, and includes conventional solid state modules to perform the required functions. The generator unit 75, which is used to energize the ultrasonic motor 65 and the horn 66, is energized by a logic gate in the control system 200 and is energized for a controlled period of the operation of the apparatus 10.

Start switch 202 is coupled to one input of latch 204, via a lead 206. The output of latch 204 is coupled to one input of gate 208, via lead 210. The output of gate 208 is coupled to the input of one shot multivibrator 212 via lead 214. The output of one shot multivibrator 212 is coupled via lead 216 to one input of a parity circuit 218, to another one shot multivibrator 220 via lead 222, and via lead 224 to an advance timer 226. One output of one shot multivibrator 220 is coupled via lead 228 to cut timer 230.

The output of cut timer 230 is coupled via lead 240 to gate 242, to parity circuit 218 via lead 244, and via lead 246 to an input of gate 208. The output of gate 242 is coupled via lead 248 to a solenoid driver 250. The output of driver 250 is coupled via lead 252 to a solenoid, not shown, which controls the compressed air line that activates the double acting cylinder 100 which is part of the reciprocating means 82 (FIG. 2).

The output of advance time 226 is coupled via lead 254 to solenoid driver 256 and via lead 258 to parity circuit 218. The output of solenoid driver 256 is coupled via lead 260 to a solenoid, not shown, which controls the air valve, not shown, that activates piston unit 142 of the feeding means 125 (FIG. 2).

The output of parity circuit 128 is coupled via lead 262 to an input of a gated latch 264. The output of gated latch 264 is coupled via lead 266 to an input of safety interlock 268. The AC input voltage is also coupled via lead 272 to an input of the solenoid driver 256, another output of safety interlock 268 is coupled via lead 274 to solenoid driver 250. The output of preset circuit 278 is coupled via lead 280 to lead 238 to preset the latches 204 and 236, to the leads 232 and 234 to preset the advance timer 226 and the cut timer 230, respectively, and to leads 296 and 297 to preset one shots 212 and 220, respectively, and through lead 276 to safety interlock 268.

The input of latch 236 is via lead 282 from an advance reset switch, not shown, which also provides via lead 284 an input of gate 242. The output of latch 236 is coupled via a lead 286 to another input of gate 208. A mode select switch, not shown, is coupled via a lead 288 to gate 290. One output of control gate 290 is coupled via a lead 292 to an input of gated latch 264 and via a lead 294 to an input of gate 208.

In operation the system control is energized by turning on the AC power. The system is designed to provide a single cycle or continuous operation in which all of the required control pulses for continuous operation are generated. It also locks the control circuits off if a discrepancy or error in function sequence occurs. The system is also provided with an interrupt button which is capable of immediately stopping the system cycle and resetting it to the initial start conditions.

The system is set to the initial or start conditions (i.e. all solenoids deenergized and all input commands overridden) by means of the preset circuitry 278 which opens the safety interlock. When a start pulse is then obtained by closing switch 202, latch 204 turns on gate 208, thereby causing one shot multivibrator 212 to generate an output pulse the trailing edge of which starts the advance timer 226 and triggers one shot multivibrator 220. The trailing edge of the resulting output pulse from multivibrator 220 starts the cut timer 230, the output pulse thereof being processes as follows:

a. If the mode select switch, which is coupled via lead 288 to gate 290, is in the single cycle mode, gate 290 inhibits the output pulse from the cut timer 230 from recycling the system. The output from gate 290 also removes the enable from the gated latch 264, and the parity circuit 218 maintains its original state at the time the enable pulse was removed. The single cycle is completed when the pulse from the cut timer 230 is processed via gate 242, which energizes the solenoid drive 250.

b. If the mode select switch is in the continuous position, gate 290 enables the gated latch 264 and the parity circuit 218 is activated. The inhibit pulse to the gate 208 is removed and the trailing edge of the pulse from the cut timer 230 retriggers the system.

The parity circuit checks the states of one shot multivibrator 212, advance timer 226 and cut timer 230 against its programmed allowed states. Any dissonance between the allowed states and the signals latches the gated latch 264 which opens the safety interlock 270.

If only an advance pulse is desired, a pulse may be applied to latch 236 which will provide an output pulse to gate 208, which in turn will trigger one shot multivibrator 212. The only difference between this command and the start command provided by switch 202 is that gate 242 is inhibited, thus preventing the cut solenoid drive circuitry 250 from operating.

Figure 15:
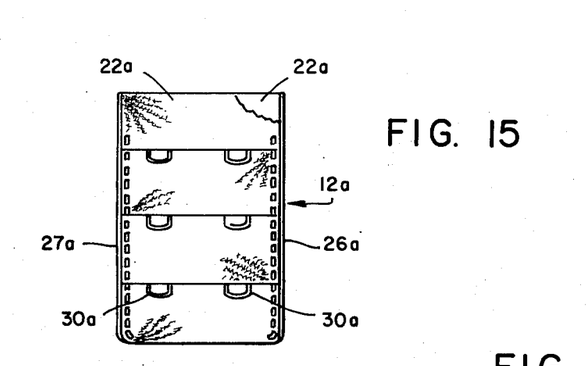
FIG. 15 is a front plan view illustrating a tape having two rows of elements positioned thereon.

As illustrated in FIG. 15, the brassiere tape 12a may be formed having two rows of spaced apart elements 30a between the respective ends 26a and 27a. This dimension may be varied by properly adjusting the limit means on the equipment. In this way articles may be formed containing two, three, or four rows of elements.

Figure 16:
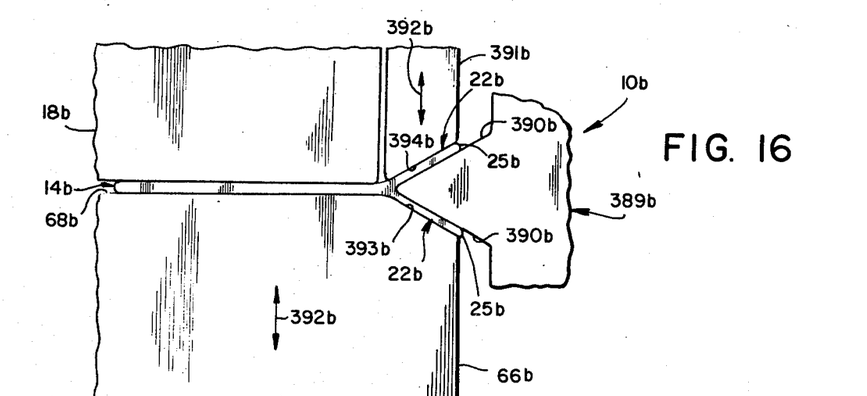
FIG. 16 is a side view of a portion of an alternative embodiment.

In accordance with another embodiment of the present invention, as illustrated in FIG. 16, the apparatus 10b may be utilized without positioning an insulation element intermediate the tabs 22b. The insulation element is utilized to prevent the adjacent layers of material from becoming welded to each other. Instead of utilizing an insulation element, there is provided stationary anvil means 389b having a pair of surfaces 390b angularly disposed relative to each other to form a V-shaped configuration. The V-shaped configuration is adapted to have the overlapping tabs 22b become separated as the strip 14b is advanced relative to the anvil means 18b and horn 66b in a manner previously described with respect to the apparatus illustrated in FIGS. 1 through 14.

A second horn 391b that would be coupled to an ultrasonic motor (not shown) is aligned with and reciprocated together with the anvil means 18b between the closed and open positions of the apparatus 10b. In the closed position of the apparatus 10b, the ultrasonic horns 66b and 391b are each vibrated in the direction of double headed arrow 392b. In this manner one tab 22b is interposed between an inclined surface 393b of horn 66b and one of the surfaces 390b such that the layers of material therebetween are welded together.

In a similar fashion the other tab 22b is interposed between the other inclined surface 390b and an inclined surface or front edge 394b of horn 391b. This ultrasonically welds the layers of material forming the other tab 22b. Preferably, the anvil 389b absorbs the ultrasonic energy from the horns 66b and 391b. The remaining portion of the strip 14b may be welded to obtain a horizontally extending weld and individual spot welds, as illustrated in FIG. 5.

The actual severing of the strip 14b may occur simultaneously with the welding or be performed by a secondary operation. The feeding means would operate in the manner previously described with respect to the prior embodiment invention.

Furthermore, in the embodiment illustrated in FIG. 16, the anvil means 18b may be associated with a compliant element for supporting same in conjunction with clamping means for the purposes previously discussed. Essentially, therefore, the embodiment of FIG. 16 differs from what was previously disclosed only in that the insulation element has been eliminated.

Although illustrative embodiments of the invention have been described in detail herein with reference to the accompanying drawings, it is to be understood that the invention is not limited to the precise embodiments, and that various changes and modifications may be effected therein without departing from the scope or spirit of the invention.

We claim:

1. Apparatus for cutting tapes from a continuous strip and welding together layers thereof comprising:
   an ultrasonically vibrating horn, and an anvil each having a surface, at least one of which includes a cutting edge, for cooperatively engaging said strip therebetween to cut and weld together said strip layers for successive tapes,
   compliant means for deforming only when subjected to a predetermined pressure when the surfaces and said horn and said anvil engage said strip such that said cutting edge on one of said surfaces is not readily dulled by successive engagements,
   clamping means for releasably clamping said anvil in abutting engagement with said compliant means such that said anvil is free to move with any deformation of said compliant means,
   advancing means for advancing said strip intermittently between said horn and said anvil for continually producing said tapes, and
   means for relatively moving said anvil and said horn to engage said strip after said strip is advanced by said advancing means.

2. Apparatus as in claim 1, wherein elements are spaced along said strip and further comprising limit means for varying movement of said advancing means, said limit means comprising:
   a. a fixed limit member,
   b. a carriage assembly movable relative to said fixed limit member,
   c. a limit block mounted on said carriage assembly and adjustable with respect thereto to various positions to limit variably the movement of said carriage assembly relative to said fixed limit member, and
   d. engaging means of said advancing means engaging said elements for advancing said strip, said engaging means being connected to said carriage assembly for strip-advancing movement therewith between extended and retracted positions.

3. Apparatus as in claim 2, and further including damping means limiting the movement of said engaging means as it reaches at least one of said extended and retracted positions of its movement for avoiding secondary advancement of said strip and maintaining registration of said strip relative to said horn and said anvil.

4. Apparatus as in claim 1, wherein said compliant means includes a deformable medium on the side of said anvil remote from said surface thereon.

5. Apparatus as in claim 1, and further comprising means for laterally adjusting at least one of said surfaces relative to said strip for controlling the location of welds formed thereby across said strip.

6. Apparatus for cutting articles from an elongated continuous strip of material formed of flexible layers and having a plurality of elements spaced along said strip, and for ultrasonically welding together said layers thereof, said apparatus comprising:
   A. ultrasonic welding means comprising a horn having an end surface for engaging one side of said strip, and means for vibrating said horn at an ultrasonic rate,
   B. anvil means having a surface for opposing and cooperating with said horn end surface while engaging the opposite side of said strip, at least one of said surfaces having a cutting edge, said horn and said anvil means thus being adapted to cut and weld said strip simultaneously into said articles,
   C. reciprocating means for effecting relative movement of said anvil means and said horn between an open position in which said anvil means and said horn are spaced apart for receiving said strip therebetween and an operative position in which said surfaces of said anvil means and horn engage said strip on opposite sides thereof, said horn at least in said operative position being ultrasonically vibrated to cut and weld said layers of said strip across the width thereof to form the trailing end of one article and the leading end of another article,
   D. compliant means for resiliently mounting said anvil means, said compliant means deforming when subjected to a predetermined pressure when said surfaces of said horn and anvil means are brought into said operative position by said reciprocating means such that said cutting edge is not readily dulled by the repetitive opposition of said surfaces in said operative position, E. clamping means for releasably securing said anvil means in abutting engagement with said compliant means such that said anvil means is free to move with any deformation of said compliant means, F. feeding means for intermittently advancing the leading end of said strip a distance predetermined by means of said elements, said feeding means being movable between a retracted position and an extended position in timed relationship to said open position of said reciprocating means, and G. damping means limiting the movement of said feeding means as it reaches said extended and said retracted positions for avoiding secondary advancement of said strip and thus maintaining registration of said strip relative to said horn and said anvil means.

7. Apparatus as in claim 6, and further including adjusting means allowing lateral movement of said anvil means relative to said strip for adjustably positioning the weld formed by the surface thereof across said strip.

8. Apparatus as in claim 7, wherein said adjusting means comprises:
   a. a holder having a pair of oppositely disposed lips with said anvil means mounted intermediate said lips for movement with said holder,
   b. a track along which said holder is movable for lateral adjustment of said anvil means, and
   c. coupling means for retaining said holder in its adjusted position.

9. Apparatus as in claim 8, wherein:
   a. said clamping means includes a lever pivotally mounted on said holder for yieldably urging said anvil means into contacting engagement with said compliant means, and
   b. said compliant means includes a deformable element on the side of said anvil means remote from said surface thereon.

10. Apparatus for severing tapes having overlapping end tabs from an elongated continuous strip of material formed of flexible layers and having a plurality of elements spaced along said strip, and for ultrasonically welding together said layers thereof, said apparatus comprising:
    A. ultrasonic welding means comprising a horn with an end surface for engaging one side of said strip, and means for vibrating said horn at an ultrasonic rate,
    B. anvil means having a surface for opposing and cooperating with said horn end surface while engaging the opposite side of said strip, at least one of said surfaces having a cutting edge, said horn and said anvil means thus being adapted to cut and weld said strip simultaneously transversely between its edges when brought into operative relationship with each other,
    C. interposing means for positioning an insulation element capable of transmitting therethrough ultrasonic vibratory energy between said tabs prior to said anvil means and said horn being brought into operative relationship with each other, such that said insulation element keeps said tabs separate while permitting individual layers of material in each of said tabs to be simultaneously welded together as said tabs and said insulation element are severed,
    D. reciprocating means for effecting relative movement of said anvil means and said horn between an open position in which said anvil means and said horn are spaced apart for receiving said strip therebetween and an operative position in which said surfaces of said anvil means and horns engage said strip on opposite sides thereof,
    E. compliant means for resiliently mounting said anvil, said compliant means deforming only when subjected to a predetermined pressure when said surfaces of said horn and anvil means are brought into operative position by said reciprocating means such that said cutting edge is not readily dulled by the repetitive opposition of said surfaces in said operative position,
    F. clamping means for releasably securing said anvil means in abutting engagement with said compliant means such that said anvil means is free to move in conjunction with any deformation in said compliant means,
    G. feeding means for intermittently advancing the leading end of said strip a distance predetermined by means of said elements, said feeding means being movable between a retracted position and an extended position in timed relationship to said open position of said reciprocating means,
    said feeding means including:
      (1) engaging means pivotally movable into contact with one of said elements on said strip for advancing the strip when said feeding means is moved from said retracted position to said extended position, and over said elements when moved from said extended position to said retracted position,
      (2) biasing means for urging said engaging means into contact with said element when advancing said strip, and
      (3) damping means limiting the movement of said feeding means as it reaches said extended position and said retracted position for avoiding secondary advancement of said strip and thus maintaining registration of said strip relative to said horn and said anvil means, and
    H. adjusting means for laterally moving said anvil means relative to said edges of said strip to adjust the position of the cut and weld across said strip.

11. Apparatus for cutting articles from an elongated continuous strip of material formed of flexible layers and having a plurality of elements spaced along said strip, and for ultrasonically welding together said layers thereof, said apparatus comprising:
    A. ultrasonic welding means comprising a horn having an end surface for engaging one side of said strip, and means for vibrating said horn at an ultrasonic rate,
    B. anvil means having a surface for opposing and cooperating with said horn end surface while engaging the opposite side of said strip, at least one of said surfaces having a cutting edge, said horn and said anvil means thus being adapted to cut and weld said strip simultaneously into said articles,
    C. reciprocating means for effecting relative movement of said anvil means and said horn between an open position in which said anvil means and said horn are spaced apart for receiving said strip therebetween and an operative position in which said surfaces of said anvil means and horn engage said strip on opposite sides thereof, said horn at least in said operative position being ultrasonically vibrated to cut and weld said layers of said strip across the width thereof to form the trailing end of one article and the leading end of another article, D. feeding means for intermittently advancing the leading end of said strip a distance predetermined by means of said elements, said feeding means being movable from a retracted position to an extended position in timed relationship to said open position of said reciprocating means, and E. damping means limiting the movement of said feeding means as it reaches said extended and said retracted positions for avoiding secondary advancement of said strip and thus maintaining registration of said strip relative to said horn and said anvil means.

12. Apparatus as in claim 11, wherein said feeding means comprises finger means pivotally movable into contact with one of said elements on said strip when said feeding means is advanced from said retracted position to said extended position for advancing said strip and over said elements upon returning said feeding means to said retracted position and said damping means comprises:

a. a pair of spring biased elements mounted on opposite ends of said finger means, and b. contacting surfaces fixedly mounted in said apparatus at spaced apart locations such that one of said spring biased elements engages one of said contacting surfaces at said extended and retracted positions of said feeding means, respectively, to urge said finger means toward said strip.

* * * * *